UNITED STATES PATENT OFFICE.

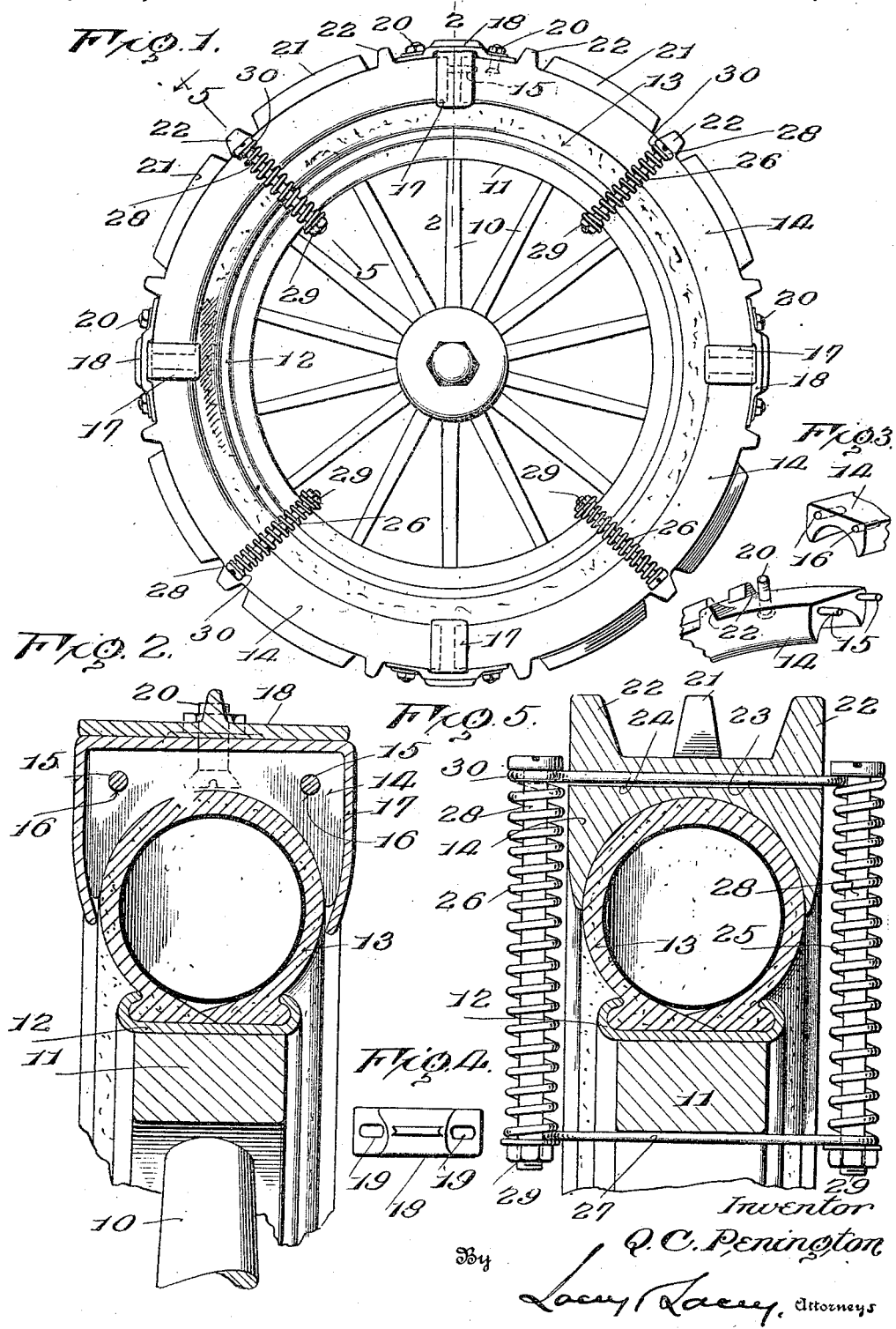

QUINTUES C. PENINGTON, OF PRYOR, OKLAHOMA.

NON-SKID TIRE-TREAD.

1,293,901. Specification of Letters Patent. Patented Feb. 11, 1919.

Application filed April 16, 1918. Serial No. 228,886.

*To all whom it may concern:*

Be it known that I, QUINTUES C. PENINGTON, a citizen of the United States, residing at Pryor, in the county of Mayes and State of Oklahoma, have invented certain new and useful Improvements in Non-Skid Tire-Treads of which the following is a specification.

This invention relates to an improved protector and nonskid tread for the pneumatic tires of motor vehicle wheels and has as its primary object to provide a device of this character not only adapted to prevent abrasion of the tire but also adapted to prevent slipping or skidding of the vehicle wheels in passing over unfavorable road surfaces.

The invention has as a further object to provide a protector and tread of the above character which will be formed of sections adapted to fit around the periphery of a tire and wherein the said sections will be detachably connected so that the tread may be readily placed in position or removed.

And the invention has as a still further object to provide a construction wherein the sections of the tread will be slidably connected so that the tread may thus expand or contract radially with the tire and wherein the sections will be yieldably held by clamping members to tightly fit about the tire.

Other and incidental objects will appear as the description proceeds. In the drawings wherein I have illustrated the preferred embodiment of the invention, and wherein similar reference characters designate corresponding parts throughout the several views:

Figure 1 is a side elevation showing my improved protector and tread in connection with a conventional type of motor vehicle wheel and tire.

Fig. 2 is a fragmentary sectional view taken on the line 2—2 of Fig. 1 and particularly showing the mounting of the joint sleeve between the ends of the sections of the tread, Fig. 3 is a fragmentary perspective view showing the manner in which the tread sections are formed at their ends, Fig. 4 is a plan view showing one of the connecting plates between the ends of the tread sections in detail.

Fig. 5 is an enlarged sectional view taken on the line 5—5 of Fig. 1 and showing the radially contracting connections between the sections of the tread and the vehicle wheel for holding the tread to tightly fit about the wheel tire.

Referring now more particularly to the drawings, I have shown my improved non-skid tread in connection with a conventional tpe of motor vehicle wheel 10 having a felly 11 carrying a rim 12 upon which is mounted a pneumatic tire 13. In carrying out the invention I employ a plurality of mating arcuate tread sections 14. These tread sections are preferably constructed of metal and, upon the inner sides thereof, are formed with channeled faces to fit the tread face of the tire. Four of the tread sections are preferably employed and when assembled upon the tire, as shown in Fig. 1 completely surround the tire. Projecting from one end of each of the sections are, as shown in detail in Fig. 3, spaced guide pins 15 adapted to slidably fit into similarly spaced openings 16 in the confronting end of an adjacent section. These guide pins will thus support the sections with respect to each other fitting about the tire and overlying the joints between the sections are sleeves 17. As particularly brought out in Fig. 2 of the drawings, these sleeves are formed to fit around the sections at their ends and slidably receive the ends of the sections therein. Furthermore, it is to be noted, as particularly shown in Fig. 1, that when the sections are assembled upon the tire, the ends of the said sections will be spaced apart somewhat within the said sleeves. Extending over the sleeves 17 are connecting plates 18 between the sections. These plates are offset adjacent the ends thereof to provide recesses upon their inner sides seating the bodies of the sleeves so that the sleeves thus cannot shift longitudinally of the sections and formed through the ends of the said plates are, as shown in detail in Fig. 4, slots 19 which receive bolts or other suitable fastening devices 20 countersunk at their inner ends within the terminals of the sections and projecting outwardly therefrom through the said slots. These bolts, as will be clear, thus serve to detachably and slidably connect the sections of the tread so that the tread may expand with the tire 13. Furthermore, this construction provides an arrangement whereby the tread may be readily placed upon or removed from the rim. As particularly brought out in Figs. 1 and 5 of the drawings, the tread sections upon their outer sides are formed with flat faces and rising from each of the sections are alternate medial longitudinal ribs 21 and transversely spaced knobs 22 adapted to effectually prevent skidding of the wheel under unfavorable road conditions. The connecting plates 18 are also preferably provided with ribs.

Formed through each of the sections at a point substantially midway of the ends thereof is a transverse opening 23 and threaded through this opening is a connecting rod 24 between a pair of spaced parallel helical springs 25 and 26 respectively, arranged at opposite sides of the section to extend radially inward therefrom at opposite sides of the tire 13 and felly 11 of the wheel. Connecting the springs at their inner ends is a rod 27 similar to the rod 24 and extending beneath the wheel felly, and fitted through the said springs are headed stop rods 28 equipped at their inner ends with nuts 29 confronting the inner ends of the springs and detachably connecting the rods with the springs. Preferably the springs and cross rods 24 and 27 are formed from a single length of material having, at one end, a straight portion to provide the rod 24, whence the said length of material is bent to form the spring 25. From the inner end of this spring the length of material is then formed with a second straight portion to provide the cross rod 27 and is thence bent to form the other spring 26. At its free end the cross rod 24 is, after being threaded through the opening 23, formed with a loop 30 fitting beneath the head of the adjacent stop rod 28 at the upper end of the spring 26. This construction provides a very simple arrangement and one whereby the springs and cross rods may be produced at minimum cost.

The springs 25 and 26 are of the contractile type so that the said springs in connection with the rods 24 and 27 will provide a clamping member. It will thus be clear that these clamping members, upon the several sections, will act to yieldably hold the sections of the tread fitting tightly about the circumference of the tire. Consequently, the said tread sections may move with the tire as it flattens at one side and expands upon the other in passing over a road surface while, at the same time, the sections will always be held snugly against the tire. Chafing of the tire will thus be eliminated. However, it is to be observed that extreme outward radial movement of the tire sections will be limited by the stop rods 28 of the clamping members so that distortion of the tread will be prevented. Furthermore, these rods will act as guide rods for the springs of the clamps to prevent the distortion of the springs.

It will, therefore, be seen that I provide a particularly simple and efficient construction for the purpose set forth and a tread which will reduce the possibility of skidding to a minimum. Furthermore, since the tread is formed to fit around the bearing surface of the tire, the said tread will act to protect the tire and prevent its abrasion.

Having thus described the invention, what is claimed as new is:

1. A device of the character described including a tread, and clamping members connected with the tread and adapted to engage beneath the felly of a wheel for holding the tread to surround a tire upon the said felly, each of the said clamping members including yieldable means contracting radially with respect to the tread, and stop means associated with said means for limiting the expansion thereof and acting to guide said means.

2. A device of the character described including a tread, and clamping members connected with the tread and adapted to engage beneath the felly of a wheel for holding the tread to surround a tire upon the said felly, each of the said clamping members including a spring contracting radially with respect to the tread, and a stop rod fitted through the said spring for limiting the expansion of the spring.

3. A device of the character described including a tread, and resilient clamping members connected to the tread and adapted to engage beneath the felly of a wheel for holding the tread to surround a tire upon the wheel, each of the said members including spaced springs adapted to extend at opposite sides of the tire, a cross rod between the outer ends of the springs connecting the said springs with the tread, and a cross rod between the inner ends of the springs and adapted to extend beneath the wheel felly.

4. A device of the character described including a tread, and resilient clamping members connected to the tread and adapted to engage beneath the felly of a wheel for holding the tread to surround a tire upon the wheel, each of the said members including spaced springs having rods extending between the ends thereof and integral with the said springs, one of the said rods being engaged through the tread to support the springs at opposite sides of the tread and the other of said rods being adapted to engage beneath the wheel felly.

5. A device of the character described including a tread formed of a plurality of mating sections, plates slidably connecting the said sections to spread at their confronting ends and sleeves overlying the joints between the sections beneath the said plates, and means engaging with the tread for connecting the tread with the felly of a wheel to surround a tire upon the said felly.

6. In a device of the character described, the combination of a tread formed of a plurality of mating sections, means carried by one end of each section and freely engaging the abutting end of an adjacent section for slidably connecting the said sections to spread at their confronting ends, and yieldable means engaging the sections for connecting the tread with the felly of a wheel to surround a tire upon the said felly clamped against the tire.

7. A device of the character described including a tread, and resilient clamping members connected to the tread and adapted to engage beneath the felly of a wheel for holding the tread to surround a tire upon the wheel, each of the said members including spaced springs formed from a length of material bent to define the springs and continued to provide cross rods extending between corresponding ends of the springs, one of said rods connecting the springs with the tread and the other of said rods being adapted to engage beneath the wheel felly.

8. A device of the character described including an annular tread formed of a plurality of longitudinally curved sections having corresponding ends thereof formed with sockets, studs projecting longitudinally from opposite corresponding ends of the sections and slidably fitting in said sockets, and longitudinally curved plates extending circumferentially of the tread and overlying the sections at the joints therebetween to slidably connect the said sections, and means engaging with the tread for connecting the tread with the felly of a wheel to surround a tire upon the said felly.

In testimony whereof I affix my signature.

QUINTUES C. PENINGTON. [L. S.]

Copies of this patent may be obtained for five cents each, by addressing the "Commissioner of Patents, Washington, D. C."